T. HOWE, Dec'd.,

L. FULTON, Administratrix, O. HOWE, Assignee.

SPRING BED BOTTOM.

No. 10,121. Reissued May 23, 1882.

Witnesses.

John F. C. Prinkert

Bernice G. Noyes.

Otis Howe Assignee of Tyler Howe, decd by Crosby & Gregory Atty's.

N. PETERS, Photo-Lithographer, Washington, D. C.

UNITED STATES PATENT OFFICE.

OTIS HOWE, OF CAMBRIDGEPORT, MASS., ASSIGNEE OF TYLER HOWE AND OF LOVINDA FULTON, ADMINISTRATRIX OF SAID TYLER HOWE, DECEASED.

SPRING BED-BOTTOM.

SPECIFICATION forming part of Reissued Letters Patent No. 10,121, dated May 23, 1882.

Original No. 100,408, dated March 1, 1870. Application for reissue filed March 1, 1882.

*To all whom it may concern:*

Be it known that TYLER HOWE, of Cambridgeport, in the county of Middlesex and State of Massachusetts, invented a new and useful Improvement in Spring Bed-Bottoms, of which the following description, in connection with the accompanying drawings, is a specification.

Figure 1:
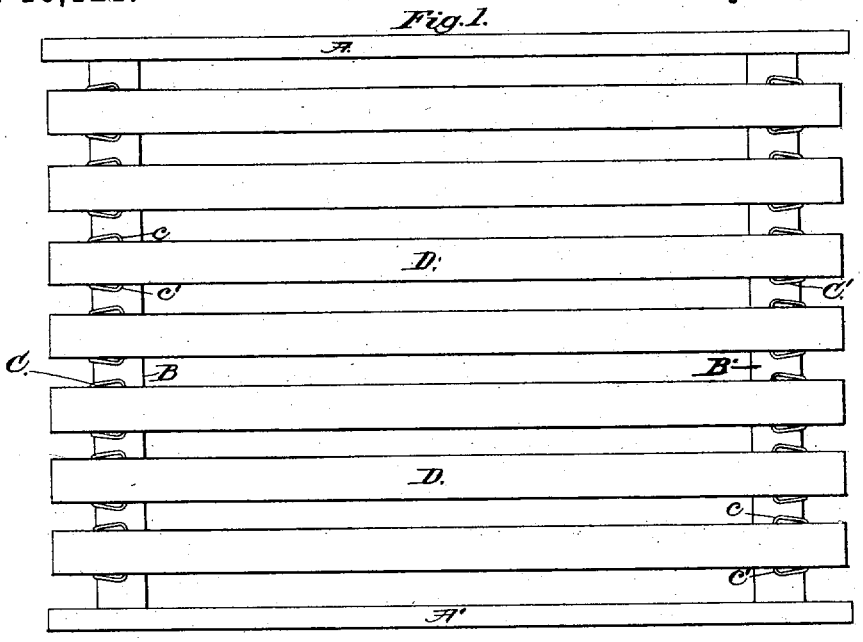
Figure 2:
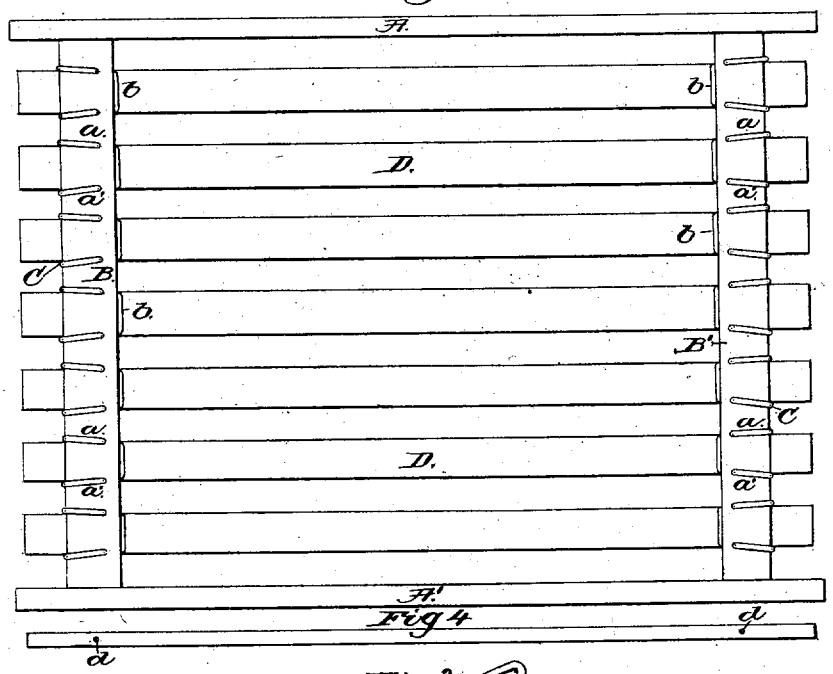
Figure 3:
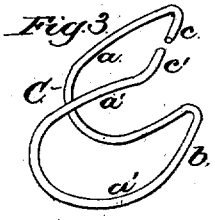

Of the drawings, Figure 1 is a top view of a bed-bottom provided with my invention. Fig. 2 is an under side view thereof. Fig. 3 is a perspective view of one of the wire springs, and Fig. 4 is a side view of one of the slats.

The invention has reference to that class of bed-foundations in which each of the slats is supported upon springs arranged near its two ends; and it consists in so forming and applying the springs to their supporting-bars and the slats as not only to form a strong and durable connection, but produce an easy, elastic, and yielding foundation for a mattress, and at the same time afford a ready means of either connecting the slats with their springs or disconnecting them therefrom, as may be desirable.

In the said drawings, A A′ denote the side rails of the bed-bottom, which are connected by means of two cross-bars, B B′. Through each of the said cross-bars a series of holes, (two in number for each slat,) are made, at a distance apart equal to or a little greater than the width of the slat, each pair of holes being to receive the two arms *a a′* of a slat-supporting spring, C. The said holes are bored on the inner side of each of the cross-bars, and extend downward at an angle of forty-five degrees, or thereabout, so as to cause them to terminate on the under side of the said bars. Next pieces of spring-wire of the proper diameter and length are bent into a rectangular shape, the base or connected end *b* of each having a length corresponding to the width of a slat or the distance between each two of a pair of holes in the cross-bars. Next the arms of the wires so bent are passed through the holes until the connected part *b* comes into close contact with the inner edge of its cross-bar or supporting-rail, as shown in Fig. 2. This mode of attaching the spring to its bar prevents any accidental detachment of it therefrom. The ends or arms *a a* of the wire are next turned upward and curved over, and partially around the cross-bars, the back and top edges of which are rounded. The ends of the wire are next bent inward toward each other at right angles to the remaining portion, so as to form journals or supports *c c′* for the slats, the same being as shown in Fig. 3; or the said ends may be so bent as to form an acute angle with the remaining portion, if desirable, in which case the holes made in the slats to receive them should have a corresponding pitch or inclination. The arms *a a′* of the said springs do not rest in contact with the curved surface of the cross-bars with which they are connected, but are curved to the arc of a circle of much larger radius, so as to allow of their springing inward, and have a sufficient degree of elasticity to prevent them from becoming "set" under any ordinary amount of pressure brought to bear upon the slats with which they are attached.

D D, &c., denote the slats of the bed-bottom, they being made of wood, and extending nearly the entire length of the bed-foundation. Each of the said slats has two holes or sockets, *d d*, formed in each side of it, near the ends thereof, the same being to receive the journals or supports *c c′* at the ends or extremities of the springs, which, when connected therewith, as shown in the drawings, maintain the slat suspended at both its opposite edges.

The invention is not limited to arranging the holes in the cross-bars in the slanting direction, as described, as the said holes may be bored vertically through the said bars; but the first-mentioned method is considered to be the better one, as the springs are not so liable to be broken or injured by a lateral strain at their points of egress on the under side of the cross-bars.

In applying the slats to the springs simply press apart the arms of the latter, and insert the journals or parts *c c′* in the sockets of the slats, and then press or restore the arms to their normal position. The elastic force of the wire will then maintain them in firm connection. To release the slats the journals or parts *c c′* have only to be withdrawn from their sockets.

By the peculiar construction of the springs, and their application to the cross-bars and the slats, several important advantages are gained over many of the bed-bottoms in the market. In the first place the springs are so constructed and arranged as not to come in contact with a mattress or bed when placed upon the slats; second, the mattress is supported throughout its entire length, and does not sag at either of its ends; third, the springs are so applied to the cross-bars as to prevent accidental detachment; and, fourth, the slats can be readily detached from the bed-bottom or applied thereto whenever it may be desirable.

The supporting of the slats of a bed-foundation upon springs arranged near the ends of such slats and attached to the cross-bars thereof is not claimed herein broadly; nor are any of the devices shown in either of the patents numbered 57,720, 69,198, or 78,825, as this invention differs therefrom.

What is claimed as the invention of the said TYLER HOWE is—

1. The described spring bed-bottom, composed of the frame or rails A A, the two cross-bars B B′, the two series of springs C C, formed as described, and the series of slats C′, arranged and applied together substantially as hereinbefore specified.

2. In a spring bed-bottom, the rails A and cross-bars B B′, and slats D, provided with holes or sockets *d* at each side near their ends, combined with a series of slat-supporting springs having journals or supports *c c′* at their ends or extremities, and adapted to be sprung into the holes or sockets in the sides of and support the said slats, substantially as and for the purpose described.

3. The slat-supporting springs bent to embrace and be held in place by the cross-bars, and having their ends or extremities turned toward each other to form journals or supports to be sprung into sockets in the edges of and support the slats, substantially as described.

OTIS HOWE.

Witnesses:
G. W. GREGORY,
B. J. NOYES.